(12) United States Patent
Kim

(10) Patent No.: US 8,961,728 B2
(45) Date of Patent: Feb. 24, 2015

(54) FILM ATTACHING APPARATUS AND FILM ATTACHING METHOD USING THE SAME

(71) Applicant: Samsung Display Co., Ltd., Yongin (KR)

(72) Inventor: Hak-Min Kim, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 20 days.

(21) Appl. No.: 13/752,901

(22) Filed: Jan. 29, 2013

(65) Prior Publication Data

US 2014/0076486 A1 Mar. 20, 2014

(30) Foreign Application Priority Data

Sep. 18, 2012 (KR) ........................ 10-2012-0103615

(51) Int. Cl.
| | | |
|---|---|---|
| *B29C 65/48* | (2006.01) | |
| *B32B 37/26* | (2006.01) | |
| *B32B 38/10* | (2006.01) | |
| *B32B 43/00* | (2006.01) | |
| *B32B 38/18* | (2006.01) | |
| *B32B 37/00* | (2006.01) | |

(52) U.S. Cl.
CPC ............. *B32B 38/18* (2013.01); *B32B 37/0046* (2013.01); *B32B 37/025* (2013.01); *B32B 2457/202* (2013.01)
USPC ............................ 156/247; 156/249; 156/289

(58) Field of Classification Search
USPC ......... 156/247, 249, 289, 537, 538, 542, 580, 156/583.8
See application file for complete search history.

(56) References Cited

U.S. PATENT DOCUMENTS

| | | | | |
|---|---|---|---|---|
| 4,248,657 | A * | 2/1981 | Henry | 156/443 |
| 5,512,126 | A * | 4/1996 | Kannabiran et al. | 156/380.9 |
| 5,929,961 | A * | 7/1999 | Nishi et al. | 349/187 |
| 6,097,455 | A * | 8/2000 | Babuka et al. | 349/73 |
| 6,459,462 | B1 * | 10/2002 | Seraphim et al. | 349/73 |
| 6,561,248 | B2 * | 5/2003 | Sasaki et al. | 156/521 |

(Continued)

FOREIGN PATENT DOCUMENTS

| | | | | |
|---|---|---|---|---|
| JP | | 10068945 A | * | 3/1998 |
| JP | | 2009109979 A | * | 5/2009 |

(Continued)

OTHER PUBLICATIONS

English Abstract of JP 2009-109979 (Aug. 5, 2014).*

(Continued)

*Primary Examiner* — Sing P Chan
(74) *Attorney, Agent, or Firm* — Robert E. Bushnell, Esq.

(57) ABSTRACT

Film attaching apparatus and process for attaching the film by preparing a mother panel comprising a first panel, a second panel, and a third panel; preparing a first and a second set tables that are independently driven from each other on a moving path of the mother panel; preparing a first film that is to be attached to the first panel on the first set table; driving the first set table to attach the first film to the first panel; preparing a second film that is to be attached to the second panel on the second set table; driving the second set table to attach the second film to the second panel; preparing a third film that is to be attached to the third panel on the first set table; and driving the first set table to attach the third film to the third panel.

5 Claims, 5 Drawing Sheets

(56) References Cited

U.S. PATENT DOCUMENTS

| | | | |
|---|---|---|---|
| 7,131,562 B2 * | 11/2006 | Ueyama et al. | 225/96.5 |
| 7,367,374 B2 * | 5/2008 | Amimoto et al. | 156/556 |
| 7,409,979 B2 * | 8/2008 | Huang et al. | 156/538 |
| 7,963,435 B2 * | 6/2011 | Sato et al. | 228/225 |
| 7,967,185 B2 * | 6/2011 | Sato et al. | 228/234.1 |
| 7,980,285 B2 * | 7/2011 | Kitada et al. | 156/511 |
| 8,002,010 B2 * | 8/2011 | Kitada et al. | 156/511 |
| 8,011,546 B2 * | 9/2011 | Ueyama et al. | 225/96 |
| 8,057,619 B2 * | 11/2011 | Koshio et al. | 156/191 |
| 8,083,885 B2 * | 12/2011 | Kitada et al. | 156/259 |
| 8,087,140 B2 * | 1/2012 | Koshio et al. | 29/417 |
| 8,088,463 B2 * | 1/2012 | Kitada et al. | 428/40.1 |
| 8,114,237 B2 * | 2/2012 | Kitada et al. | 156/259 |
| 8,172,631 B2 * | 5/2012 | Hirata et al. | 445/24 |
| 8,182,637 B2 * | 5/2012 | Nakahira et al. | 156/256 |
| 8,187,048 B2 * | 5/2012 | Kitada et al. | 445/25 |
| 8,197,629 B2 * | 6/2012 | Umemoto et al. | 156/247 |
| 8,211,253 B2 * | 7/2012 | Yura et al. | 156/64 |
| 8,248,558 B2 * | 8/2012 | Kimura et al. | 349/96 |
| 8,259,263 B2 * | 9/2012 | Kimura et al. | 349/96 |
| 8,272,421 B2 * | 9/2012 | Hada et al. | 156/556 |
| 8,277,587 B2 * | 10/2012 | Kimura et al. | 156/64 |
| 8,313,605 B2 * | 11/2012 | Yamamoto et al. | 156/248 |
| 8,317,961 B2 * | 11/2012 | Kitada et al. | 156/257 |
| 8,366,858 B2 * | 2/2013 | Kitada et al. | 156/264 |
| 8,398,800 B2 * | 3/2013 | Yura et al. | 156/182 |
| 8,398,805 B2 * | 3/2013 | Kitada et al. | 156/256 |
| 8,398,806 B2 * | 3/2013 | Yokouchi et al. | 156/257 |
| 8,404,334 B2 * | 3/2013 | Kimura et al. | 428/212 |
| 8,414,993 B2 * | 4/2013 | Nakazono et al. | 428/40.1 |
| 8,427,625 B2 * | 4/2013 | Koshio et al. | 349/187 |
| 8,460,490 B2 * | 6/2013 | Nakazono et al. | 156/64 |
| 8,477,267 B2 * | 7/2013 | Fujisawa et al. | 349/95 |
| 8,491,737 B2 * | 7/2013 | Kimura et al. | 156/64 |
| 8,500,937 B2 * | 8/2013 | Kitada et al. | 156/247 |
| 8,508,697 B2 * | 8/2013 | Hirata et al. | 349/96 |
| 8,529,722 B2 * | 9/2013 | Umemoto et al. | 156/257 |
| 8,591,690 B2 * | 11/2013 | Sugimoto et al. | 156/257 |
| 8,603,283 B2 * | 12/2013 | Kitada et al. | 156/249 |
| 8,641,851 B2 * | 2/2014 | Lee et al. | 156/249 |
| 8,657,976 B2 * | 2/2014 | Kimura et al. | 156/64 |
| 8,709,181 B2 * | 4/2014 | Kitada et al. | 156/64 |
| 8,715,445 B2 * | 5/2014 | Sugimoto et al. | 156/257 |
| 2002/0057413 A1 * | 5/2002 | Sumida et al. | 349/187 |
| 2002/0144789 A1 * | 10/2002 | Sasaki et al. | 156/521 |
| 2005/0016670 A1 * | 1/2005 | Kanbara et al. | 156/257 |
| 2005/0206816 A1 * | 9/2005 | Huang et al. | 349/117 |
| 2006/0279679 A1 * | 12/2006 | Fujisawa et al. | 349/116 |
| 2007/0126966 A1 * | 6/2007 | Takahashi | 349/130 |
| 2009/0029100 A1 * | 1/2009 | Wigdorski et al. | 428/98 |
| 2009/0053964 A1 * | 2/2009 | Nozaki | 445/25 |
| 2010/0288420 A1 * | 11/2010 | Kimura et al. | 156/64 |
| 2010/0294418 A1 * | 11/2010 | Yura et al. | 156/64 |
| 2010/0316817 A1 * | 12/2010 | Kimura et al. | 428/1.31 |
| 2011/0126975 A1 * | 6/2011 | Fujisawa et al. | 156/275.5 |
| 2011/0284147 A1 * | 11/2011 | Nakazono et al. | 156/64 |
| 2012/0037317 A1 * | 2/2012 | Han | 156/378 |
| 2012/0160420 A1 * | 6/2012 | Kimura et al. | 156/351 |
| 2012/0211167 A1 * | 8/2012 | Kimura et al. | 156/379 |
| 2012/0216937 A1 * | 8/2012 | Kimura et al. | 156/64 |
| 2012/0312462 A1 * | 12/2012 | Hirata et al. | 156/235 |
| 2013/0126080 A1 * | 5/2013 | Hirata et al. | 156/248 |
| 2013/0295337 A1 * | 11/2013 | Busman et al. | 428/174 |
| 2014/0076486 A1 * | 3/2014 | Kim | 156/235 |
| 2014/0085723 A1 * | 3/2014 | Hada et al. | 359/489.11 |
| 2014/0090779 A1 * | 4/2014 | Hada et al. | 156/256 |

FOREIGN PATENT DOCUMENTS

| | | |
|---|---|---|
| KR | 100148813 B1 | 6/1998 |
| KR | 1020050118343 A | 12/2005 |
| KR | 1020070071554 A | 7/2007 |
| WO | WO 2009020339 A1 * | 2/2009 |

OTHER PUBLICATIONS

English Abstract of JP 10-68945 (Aug. 5, 2014).*

* cited by examiner

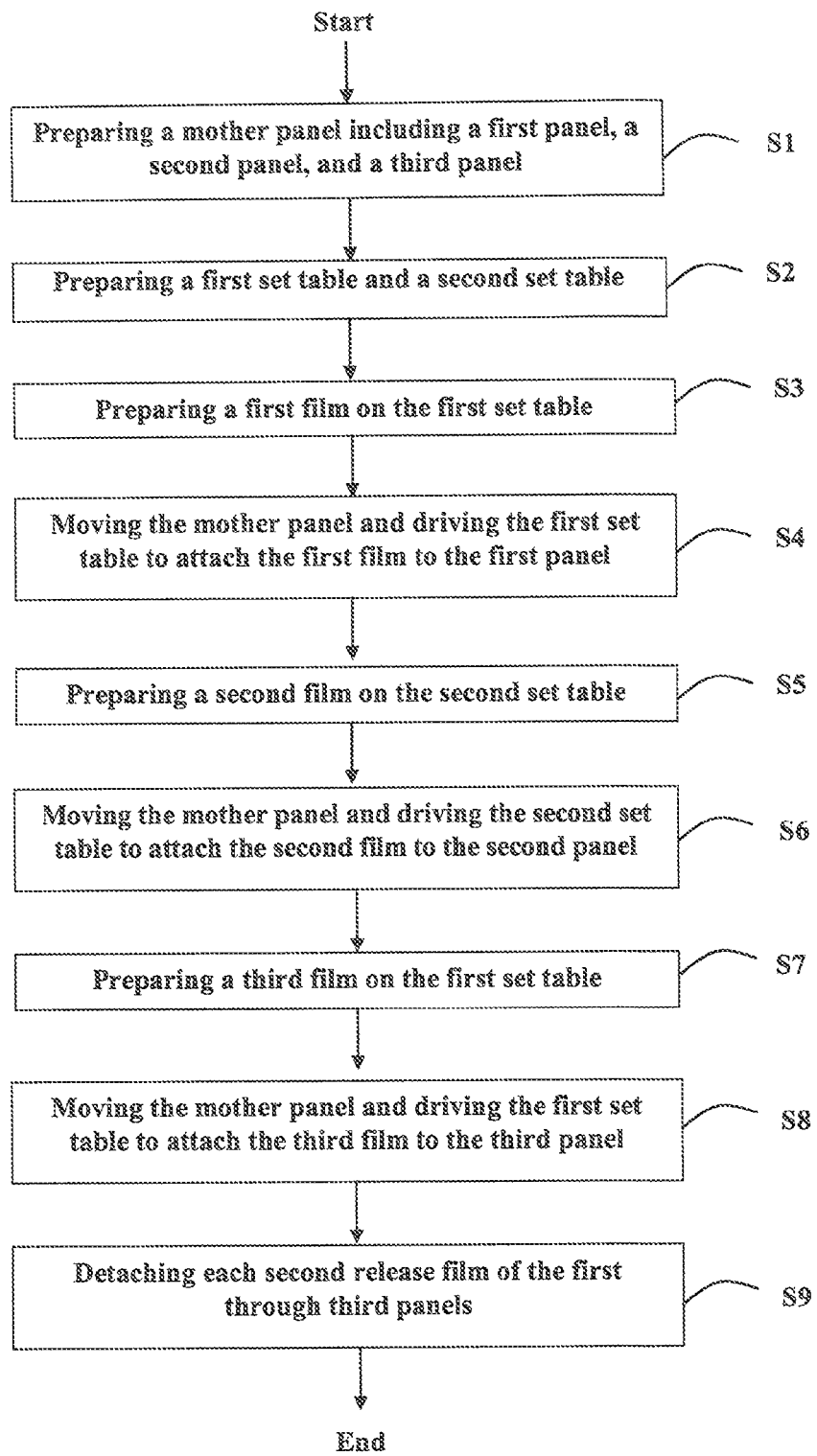

FILM ATTACHING APPARATUS AND FILM ATTACHING METHOD USING THE SAME

CLAIM OF PRIORITY

This application makes reference to, incorporates the same herein, and claims all benefits accruing under 35 U.S.C. §119 from an application earlier filed in the Korean Intellectual Property Office on Sep. 18, 2012 and there duly assigned Serial No. 10-2012-0103615.

BACKGROUND OF THE INVENTION

1. Field of the Invention

Embodiments of the present invention generally relate to a film attaching apparatus and a method using the same, and more particularly, to a film attaching apparatus used to attach a film, such as a polarization film, to a panel of a flat panel display apparatus and a film attaching method using the same.

2. Description of the Related Art

A film, such as a polarization film, is attached to a panel of a flat panel display apparatus, for example, an organic light emitting display apparatus or a liquid crystal display device.

In general, a release film is attached to the film such as the polarization film, and thus, to attach the film to a panel, the release film has to be detached from the film and then the film is attached to the panel.

However, for a mother panel in which a plurality of panels, not a single panel, are arranged, a method of efficiently attaching the film such as the polarization film to the plurality of panels is required. Although a process of attaching the film simultaneously to the plurality of panels in the mother panel may be considered, defects such as air pores between the film and the panels are likely to occur due to degradation of accuracy in the attaching operation.

Therefore, in view of the aforementioned defects, difficulties, and imperfections occurring during fabrication, a method of performing a film attaching operation to panels stably and smoothly has become necessary.

SUMMARY OF THE INVENTION

The present invention provides a film attaching apparatus capable of attaching films accurately and stably, and a film attaching method using the film attaching apparatus.

According to an aspect of the present invention, there is provided a film attaching apparatus including: a panel transfer unit for transferring a mother panel including a plurality of panels; and a first film attaching unit and a second film attaching unit for respectively attaching films to the plurality of panels.

The first film attaching unit may include a first set table, on which a film is mounted, adhering to one of the plurality of panels so as to attach the film to the panel, and the second film attaching unit may include a second set table, on which a film is mounted, adhering to one of the plurality of panels so as to attach the film to the panel.

The first set table and the second set table may have the same size as each other, or the first set table and the second set table may have different sizes from each other.

The first set table and the second set table may be positioned on a moving path of the mother panel and are independently driven from each other.

The panel transfer unit may include a support head for supporting the mother panel, and a linear motor unit for transferring the support head along a path on which the first film attaching unit and the second film attaching unit are arranged.

According to another aspect of the present invention, there is provided a film attaching method including preparing a mother panel comprising a first panel, a second panel, and a third panel, preparing a first set table and a second set table that are independently driven from each other on a moving path of the mother panel, preparing a first film that is to be attached to the first panel on the first set table, driving the first set table to attach the first film to the first panel, preparing a second film that is to be attached to the second panel on the second set table, driving the second set table to attach the second film to the second panel, preparing a third film that is to be attached to the third panel on the first set table, and driving the first set table to attach the third film to the third panel.

The films may be attached in an order of the first film, the second film, and the third film, and the mother panel may be reciprocated in sequence of a position corresponding to the first set table, a position corresponding to the second set table, and the position corresponding to the first set table.

Release films may be attached to opposite surfaces of each of the first through third films, one of the release films attached to the opposite surfaces may be removed in the preparing of the first film, the second film, or the third film, and the other release film is removed after attaching the first film, the second film, or the third film.

The first set table and the second set table may have the same size as each other, or different sizes from each other.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 5 is a process flow chart illustrating a method of attaching a film by using the film attaching apparatus of FIG. 1.

DETAILED DESCRIPTION OF THE INVENTION

Hereinafter, embodiments of the present invention will be described in detail with reference to accompanying drawings.

Figure 1:
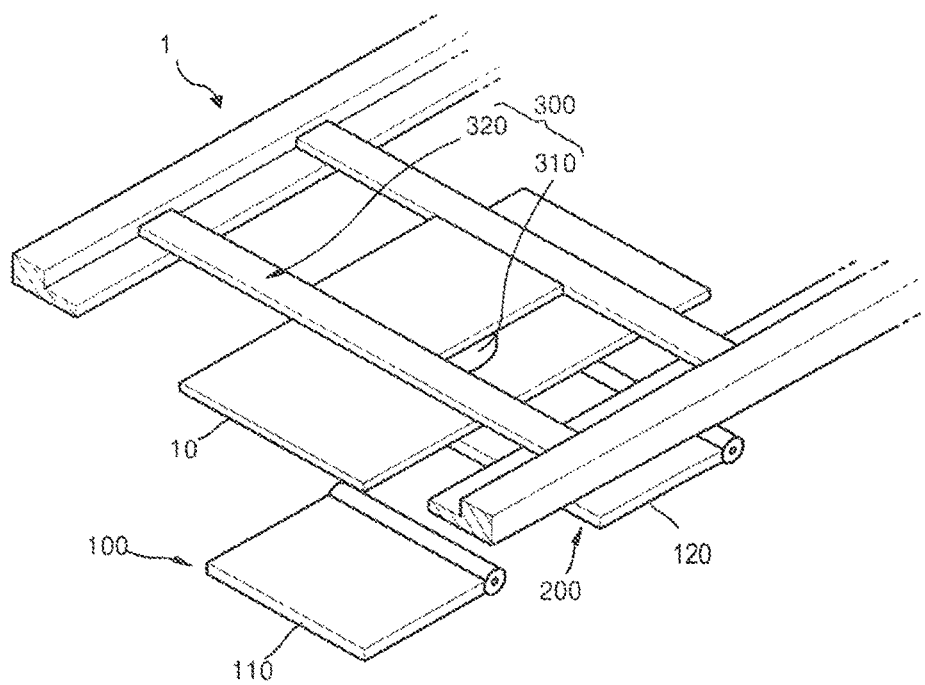
FIG. 1 is an oblique view of a film attaching apparatus according to an embodiment of the present invention.

FIG. 1 is an oblique view of a film attaching apparatus constructed according to an embodiment of the present invention.

As shown in FIG. 1, a film attaching apparatus 1 of the present embodiment includes a panel transfer unit 300 for transferring a mother panel 10, and a first film attaching unit 100 and a second film attaching unit 200 for attaching a film to the mother panel 10.

Figure 2:
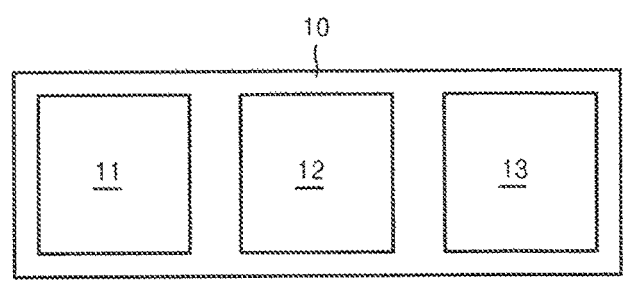
FIG. 2 is a plan view of a mother panel of the film attaching apparatus of FIG. 1.

As shown in FIG. 2, a plurality of panels, that is, first through third panels 11, 12, and 13, are formed in the mother panel 10, and a film, such as a polarization film, is attached to each of the first through third panels 11 through 13 by using the film attaching apparatus 1.

Figure 3:
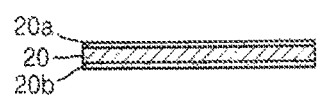
FIG. 3 is a cross-sectional view of a film to be used in the film attaching apparatus of FIG. 1.

FIG. 3 shows a film 20 which may be attached to the first through third panels 11 through 13, and two protective release films 20a and 20b are respectively attached to opposite main surfaces of the film 20. When attaching the film 20 to the first through third panels 11 through 13, the protective release films 20a and 20b on the opposite surfaces of the film 20 are separated from the film 20 at appropriate time.

Referring back to FIG. 1, the panel transfer unit 300 includes a support head 310 holding the mother panel 10, and a linear motor unit 320 for reciprocating the support head 310. When the linear motor unit 320 is driven after the mother panel 10 has been fixed on the support head 310, the mother panel 10 is reciprocated along a path on which the first and second film attaching units 100 and 200 are arranged.

In addition, the first and second film attaching units 100 and 200 respectively includes a first set table 110 and a second set table 120 on which the film 20 is mounted. That is, after mounting the film 20 respectively on the first and second set tables 110 and 120, the film 20 is adhered to one of the first through third panels 11, 12, and 13 attached to the mother panel 10. The film 20 may be adhered to the first through third panels 11 through 13 in many ways, one of which is that the film 20 is adhered while the first and second set tables 110 and 120 are elevated and rotated and is described as follows.

The film attaching apparatus 1 having the above structure attaches a film to the first through third panels 11 through 13 through processes shown in FIGS. 4A through 4H and a process flow chart shown in FIG. 5.

First, at step S1, the mother panel 10 including the first through third panels 11 through 13 is prepared.

And then, at step S2, the first set table 110 and the second set table 120 are prepared. The first set table 110 and the second set table 120 may be independently driven from each other on a moving path of the mother panel 10.

Figure 4A:
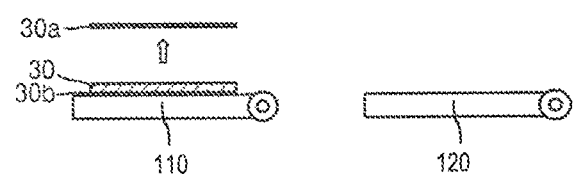
FIGS. 4A through 4H are schematic diagrams sequentially illustrating a method of attaching a film by using the film attaching apparatus of FIG. 1.

Next, at step S3, a first film 30 is prepared. More specifically, as shown in FIG. 4A, the first film 30 that will be attached to the first panel 11 is mounted on the first set table 110, and a first release film 30a attached to a surface of the first film 30 is detached. A release film may be detached in such a way that the corresponding release film is stuck onto a roller having an adhesive force on an outer circumferential surface thereof and detached by the roller, or may be detached manually. Alternatively, the first release film 30a may be detached first, and then the first film 30 may be mounted on the first set table 110. In addition, a surface of the first film 30 that is mounted on the first set table 110 and detached from the first release film is cleaned.

Figure 4B:
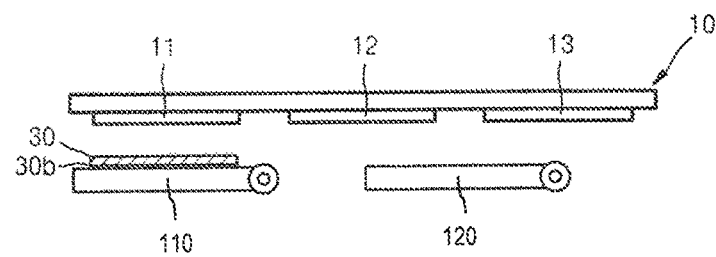

Next, at step S4, as shown in FIG. 4B, the panel transfer unit 300 is driven to locate the first panel 11 in the mother panel 10 at a position facing the first set table 110. Here, a surface of the first panel 11 is cleaned in advance.

Figure 4C:
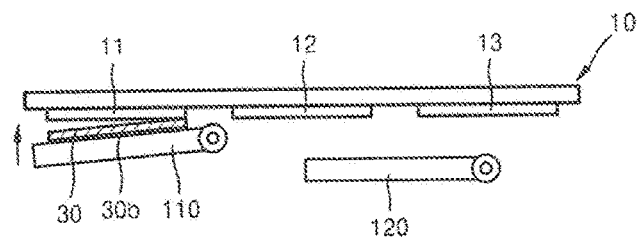

In this state, the first set table 110 is elevated and rotated as shown in FIG. 4C so as to strongly compress the first film 30 mounted thereon to be attached to the first panel 11.

Figure 4D:
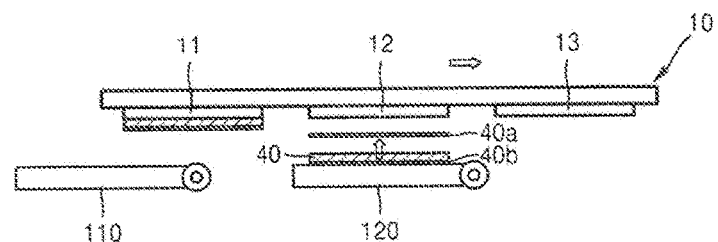

Thus, as shown in FIG. 4D, the first film 30 is attached to the first panel 11.

Next, at step S5, a second film 40 is prepared. More specifically, also as shown in FIG. 4D, the second film 40 that is to be attached to the second panel 12 is mounted on the second set table 120. Likewise, a first release firm 40a on the second film 40 is removed and a surface of the second film 40 is cleaned.

Then, at step S6, the panel transfer unit 300 is driven so as to locate the second panel 12 in the mother panel 10 at a position facing the second set table 120. Here, a surface of the second panel 12 is cleaned in advance.

Figure 4E:
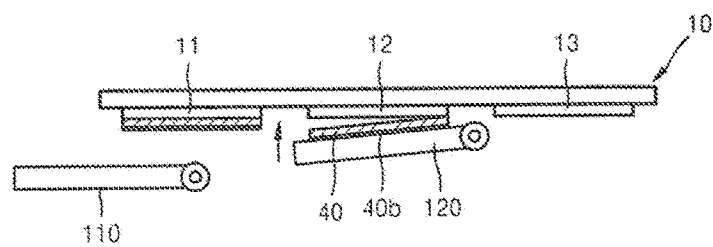

In this state, the second set table 120 is elevated and rotated as shown in FIG. 4E to strongly compress the second film 40 mounted thereon to be attached to the second panel 12.

Figure 4F:
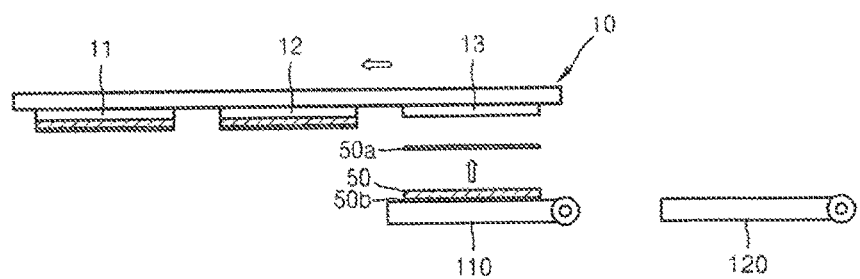

Thus, as shown in FIG. 4F, the second film 40 is attached to the second panel 12.

Next, at step S7, a third film 50 is prepared. More specially, also as shown in FIG. 4F, the third film 50 that will be attached to the third panel 13 is mounted on the first set table 110. That is, the first and second set tables 110 and 120 are alternately used. Likewise, a first release film 50a of the third film 50 is removed, and a surface of the third film 50 is cleaned.

Then, at step S8, the panel transfer unit 300 is driven to locate the third panel 13 in the mother panel 10 at a position facing the first set table 110. Here, a surface of the third panel 13 is cleaned in advance.

Figure 4G:
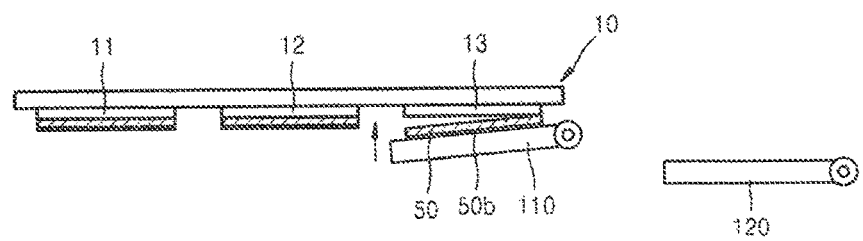

In this state, the first set table 110 is elevated and rotated as shown in FIG. 4G to strongly compress the third film 50 mounted thereon to be attached to the third panel 13. Thus, the third film 50 is attached to the third panel 13 as shown in FIG. 4H.

Figure 4H:
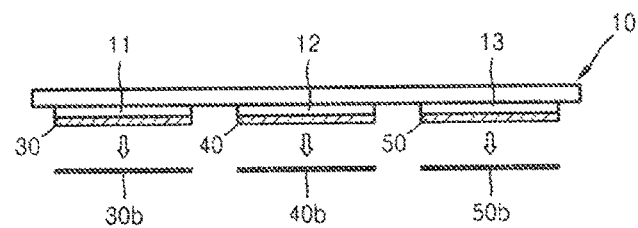

Next, at step S9, also as shown in FIG. 4H, second release films 30b, 40b, and 50b respectively attached on the other surfaces of the first, second, and third films 30, 40, and 50 are detached. Thus, the entire operation of attaching the first through third films 30 through 50 respectively to the first through third panels 11 through 13 in the mother panel 10 is finished.

As an alternative to step S9 and the process flow shown in FIG. 4H, the second release films 30b, 40b, and 50b may be individually detached from the first, second, and third films 30, 40, and 50, following the respective film attaching steps, i.e., steps S4, S6, and S8.

Therefore, in the above described manner, the film attaching operation to the first through third panels 11 through 13 arranged in the mother panel 10 may be performed by using the first and second set tables 110 and 120 alternately.

As such, the film may be sequentially attached to one panel at once, not to a plurality of panels simultaneously, and thus, the film may be attached precisely. Also, since the first and second set tables 110 and 120 are used alternately, a space occupied by the film attaching apparatus may be minimized while performing the attaching operation sufficiently.

Meanwhile, the first and second set tables 110 and 120 may have the same size to each other or different sizes from each other. For example, the first and second set table 110 and 120 having the same size to be suitable for a panel of 55 inches may be manufactured to be used as exclusively for the panels of the 55-inch standard. Otherwise, the first set table 110 may be manufactured to be suitable for panels of 55 inches, and the second set table 120 may be manufactured to be suitable for panels of 70 inches so that film attaching operations to panels of different standards from each other may be performed.

According to the film attaching apparatus of the present invention, the film attaching operation to the mother panel including a plurality of panels may be performed stably and sufficiently while reducing a space occupied by the film attaching apparatus, and thus, manufacturing yield may be improved.

The aforementioned embodiments of the present invention only illustrate a film attaching apparatus which includes a mother panel including three panels, and a method using the same, but the present invention is not limited to this. Alternatively, a film attaching apparatus constructed according to another embodiment of the present invention may include a mother panel including four or more panels. Consequently, a method of using the film attaching apparatus may be modified to attach a film to the four or more panels by alternately using a first set table and a second set table.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A film attaching method, comprising:
preparing a mother panel comprising a first panel, a second panel, and a third panel;
preparing a first set table and a second set table that are driven independently from each other on a moving path of the mother panel;
preparing a first film to be attached to the first panel on the first set table;
driving the first set table to attach the first film to the first panel;
preparing a second film to be attached to the second panel on the second set table;
driving the second set table to attach the second film to the second panel;
preparing a third film to be attached to the third panel on the first set table; and
driving the first set table to attach the third film to the third panel.

2. The film attaching method of claim 1, wherein the films are attached in an order of the first film, the second film, and the third film, and the mother panel is reciprocated in sequence of a position corresponding to the first set table, a position corresponding to the second set table, and the position corresponding to the first set table.

3. The film attaching method of claim 1, wherein release films are attached to opposite surfaces of each of the first through third films, one of the release films attached to the opposite surfaces is removed when preparing of the first film, the second film, or the third film, and the other release film is removed after attaching the first film, the second film, or the third film.

4. The film attaching method of claim 1, wherein the first set table and the second set table each have the same size.

5. The film attaching method of claim 1, wherein the first set table and the second set table have different sizes.

* * * * *